United States Patent Office 3,285,834
Patented Nov. 15, 1966

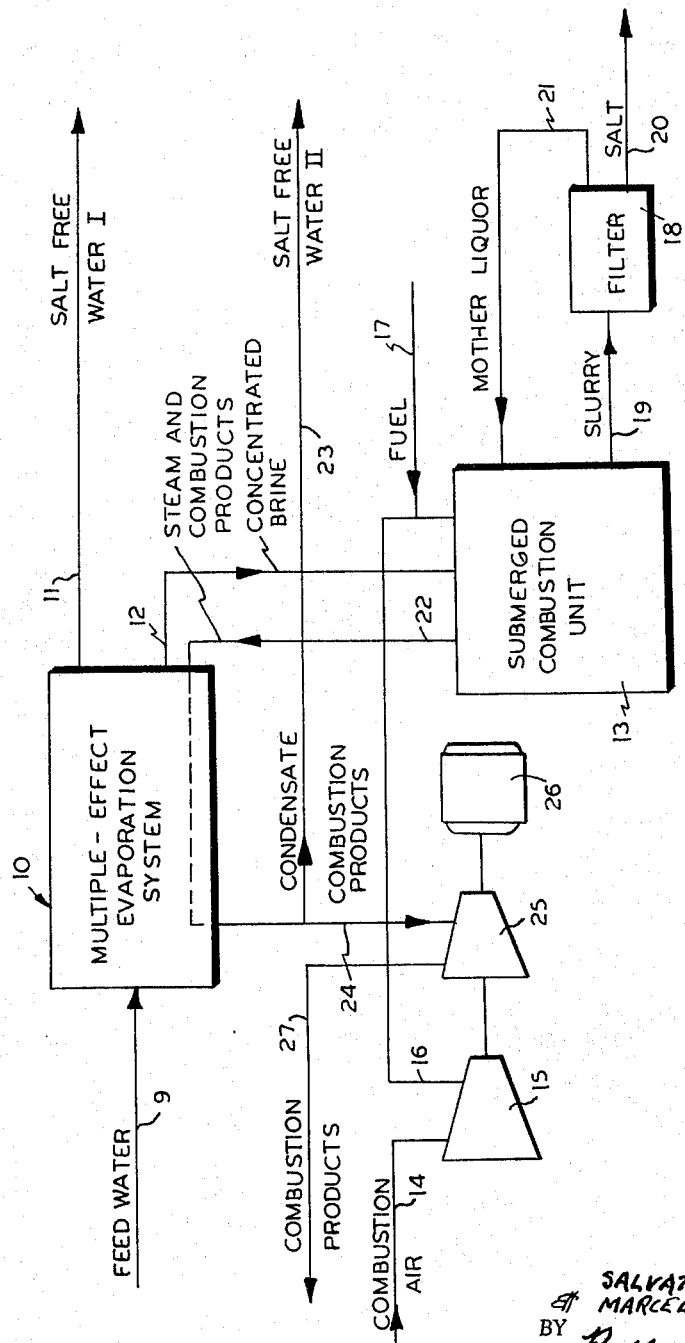

3,285,834
MULTIPLE-EFFECT EVAPORATION UTILIZING SUBMERGED COMBUSTION HEAT
Salvatore A. Guerrieri, Rowayton, and Marcel J. P. Bogart, Stamford, Conn., assignors to The Lummus Company, New York, N.Y., a corporation of Delaware
Filed Dec. 10, 1962, Ser. No. 243,319
8 Claims. (Cl. 203—25)

The present invention relates to multiple-effect evaporation process and apparatus utilizing submerged combustion techniques for generating steam for the system and, more particularly, to multiple-effect evaporation process and apparatus utilizing submerged combustion techniques for generating steam from normally concentrated brine wherein salt in solid form is recovered.

Present processes for demineralizing saline or brackish waters involving evaporation techniques to produce salt-free water, generally present the problem of the disposal of the concentrated brine when the feed water is from an inland source. The concentrated brine cannot be pumped back into the ground, since this would eventually result in a build-up of the mineral content of the ground water to a point where it would be no longer useful as a feed. Disposal of the concentrated brine into rivers is objectionable since this would result in pollution of the streams.

In accordance with the present invention, concentrated brine, for example, from a multiple-effect evaporation system is passed to a submerged combustion unit for further concentration. The slurry formed in the submerged combustion unit is filtered to remove the solids content and the mother liquor returned to the submerged combustion unit. The heat content of steam and combustion products formed in the submerged combustion unit provide the heat requirements for operation of the multiple-effect evaporation system. The solid residue withdrawn from the filtering step is then disposed of in any suitable manner.

Accordingly, it is an object of the present invention to provide an improved process for concentrating solutions and recovering the soild contents thereof.

Another object of the present invention is to provide a process for treating solutions utilizing a multiple-effect evaporation process and a submerged combustion unit wherein the products of combustion and steam formed in the submerged combustion unit provide the heat requirements for the multiple-effect evaporation system.

A further object of the present invention is to provide a process and apparatus for producing salt-free water from saline or brackish water which avoids the brine disposal problems of the prior art.

These and other objects, features and advantages of the present invention will become more apparent from the following description when taken in conjunction with the drawing, which illustrates a schematic flow diagram of the present invention.

Referring now to the drawing, feed water in line 9 is introduced into a multiple-effect evaporation system generally designated by reference numeral 10. The multiple-effect evaporation system 10 may be comprised of conventional multiple-effect evaporators generally known in the art, and may be of a varying number of effects, depending on economic and thermo-dynamic factors. Vapor generated from the feed water in the multiple-effect evaporation system 10 is condensed, collected and withdrawn from the system 10 through product line 11 as substantially salt-free water.

The concentrated brine leaving the last effect of the multiple-effect evaporation system 10 is passed via line 12 to a submerged combustion unit 13, normally operated under a pressure greater than atmospheric. The burner or burners (not shown) employed in submerged combustion unit 13 may be of any known construction. Combustion air in line 14 is introduced into a compressor 15 wherein the air is compressed and is passed through line 16 for admixture with a fuel in line 17 prior to introduction into the submerged combustion unit 13. In submerged combustion unit 13, the concentrated brine is intimately contacted with the hot combustion products, thereby evaporating water from the brine, and thus further concentrating the brine introduced into unit 13 through line 12.

A salt slurry is withdrawn from the submerged combustion unit 13 and is passed to a separation unit 18, such as a filter or centrifuge, through line 19. In separation unit 18, the salt is separated from the mother liquor and is discharged from the process, as indicated diagrammatically by line 20, and the mother liquor is recycled to unit 13 through line 21.

Steam generated in unit 13 and the gaseous combustion products are withdrawn from unit 13 through line 14 and are passed to the multiple-effect evaporation system 10. The heat content of the steam and combustion products are utilized to supply heat to the multiple-effect evaporation system 10. In the multiple-effect evaporation system 10, the steam in line 22 is condensed, and the condensate removed as additional salt-free water through line 23. The now cooled gaseous combustion products are passed through line 24 to a turbine 25 for driving compressor 15, which is provided with an auxiliary motor 26. From turbine 25, the combustion products are passed to exhaust via line 27.

In an especially advantageous mode of operation in accordance with the present invention, the steam and combustion products introduced into multiple-effect evaporation system 10 through line 22 provide the entire heat requirements for the system 10. In this manner, separate heat generating means for the evaporation system 10 are obviated and an overall thermal balance is obtained. This advantageous heat balance is obtained by selection of proper operating conditions. It is believed that one skilled in the art, if advised of the above explained objective, could perform the requisite calculations to achieve the proper operating conditions to carry out the above objective.

While the foregoing illustrative embodiment of the present invention has been described in accordance with the separation of salt from saline water, it will be appreciated that features of the present invention may be applied to the separation of solids from other aqueous solutions. Also, the invention may be applicable to the concentration of acids, provided that the combustion gases do not deleteriously react with the solution to be concentrated. Furthermore, it will be appreciated that conventional control means such as flow control means, level control means and temperature responsive means, as well as pumping means have been omitted from the foregoing description, since such means are well known in the art.

While we have shown and described one embodiment in accordance with the present invention, it is understood that the same is not limited thereto but is susceptible of many changes and modifications within the spirit and scope of the present invention, and we, therefore, do not wish to be limited to the details shown and described herein but intend to cover all such changes and modifications as are encompassed by the scope of the appended claims.

We claim:
1. A process for producing a substantially salt-free water from saline water, comprising the steps of subjecting said saline water to multiple-effect evaporation to yield a salt-free water product and a concentrated brine, further concentrating said concentrated brine to a slurry by direct contact with combustion products in a submerged combustion unit, separating said slurry into a solid residue and a mother liquor, recycling said mother liquor to said submerged combustion unit, and utilizing said combustion products and steam produced by the evaporation of water from said concentrated brine in said submerged combustion unit to supply heat for the evaporation step for the production of said salt-free water product.

2. A process for producing substantially salt-free water from saline water, comprising the steps of subjecting said saline water to multiple-effect evaporation to yield a salt-free water product and a concentrated brine, further concentrating said concentrated brine to a slurry by direct contact with combustion products in a submerged combustion unit, separating said slurry into a solid residue and a mother liquor, recycling said mother liquor to said submerged combustion unit, utilizing said combustion products and steam produced by the evaporation of water from said concentrated brine in said submerged combustion unit to supply heat for the evaporation step for the production of said salt-free water product, and collecting condensate formed by the condensation of said steam in said multiple-effect evaporation step as additional salt-free water product.

3. A process for producing a substantially salt-free water from saline water, comprising the steps of subjecting said saline water to multiple-effect evaporation to yield a salt-free water product and a concentrated brine, further concentrating said concentrated brine to a slurry by direct contact with combustion products in a submerged combustion unit, separating said slurry into a solid residue and a mother liquor, recycling said mother liquor to said submerged combustion unit, and utilizing said combustion products and steam produced by the evaporation of water from said concentrated brine in said submerged combustion unit to supply all of the heat for said multiple-effect evaporation step for the production of said salt-free water product.

4. A process for producing a substantially salt-free water from saline water, comprising the steps of subjecting said saline water to multiple-effect evaporation to yield a salt-free water product and a concentrated brine, further concentrating said concentrated brine to a slurry by direct contact with combustion products in a submerged combustion unit, separating said slurry into a solid residue and a mother liquor, recycling said mother liquor to said submerged combustion unit, utilizing said combustion products and steam produced by the evaporation of water from said concentrated brine in said submerged combustion unit to supply all of the heat for said multiple-effect evaporation step for the production of said salt-free water product, and collecting condensate formed by the condensation of said steam in said multiple-effect evaporation as additional salt-free water product.

5. A process for removing dissolved solids from a solution, comprising the steps of evaporating vapor from said solution to leave a concentrated brine, further concentrating said concentrated brine to a slurry by direct contact with combustion products in a submerged combustion unit, separating said slurry into a solid residue and a mother liquor, recycling said mother liquor to said submerged combustion unit, and utilizing said combustion products and steam produced by the evaporation of water from said concentrated brine in said submerged combustion unit to supply heat for said evaporation step.

6. A process for removing the dissolved solids from a solution, comprising the steps of evaporating vapor from said solution to leave a concentrated brine, further concentrating said concentrated brine to a slurry by direct contact with combustion products in a submerged combustion unit, separating said slurry into a solid residue and a mother liquor, recycling said mother liquor to said submerged combustion unit, utilizing said combustion products and steam produced by the evaporation of water from said concentrated brine in said submerged combustion unit to supply all of the heat for said evaporation step, and collecting condensate formed by the condensation of said steam in said evaporation step.

7. A process for removing the dissolved solids from a concentrated brine, comprising the steps of passing said brine to a submerged combustion unit, directly contacting said brine with hot products of combustion in said submerged combustion unit to further concentrate said brine into a slurry by the generation of steam therefrom, removing said slurry from said submerged combustion unit, separating solids from said slurry, and returning the remaining mother liquor to said submerged combustion unit.

8. Apparatus for the production of salt-free water from brackish water, comprising a multiple-effect evaporation system wherein feed water is subjected to distillation into an overhead salt-free product and a concentrated brine, a submerged combustion unit, means for passing said concentrated brine to said unit, means for supplying combustion air and fuel to said unit for combustion therein to concentrate said brine into a slurry by direct contact with hot combustion products, means for discharging said slurry from said unit, means for separating solids from the discharged slurry and for returning the remaining mother liquor to said unit, conduit means for conveying steam produced by evaporation from said brine in said unit and combustion products to said multiple-effect evaporation system for heat exchange with said feed water, said steam being therein condensed, means for collecting the resulting condensate as additional salt-free water, turbine means, and conduit means for passing said combustion products to said turbine means for utilization of the energy in said combustion products.

References Cited by the Examiner

UNITED STATES PATENTS

| | | | |
|---|---|---|---|
| 713,298 | 11/1902 | Goss | 203—100 X |
| 2,090,984 | 8/1937 | Peebles | 159—16 |
| 2,468,455 | 4/1949 | Metziger. | |
| 2,756,029 | 7/1956 | Brogdon | 159—16 X |
| 2,781,635 | 2/1957 | Brogdon. | |
| 2,834,409 | 5/1958 | Petersen | 159—16 X |
| 2,863,501 | 12/1958 | Farnsworth. | |
| 2,871,116 | 1/1959 | Clark. | |
| 3,076,096 | 1/1963 | Bachmann. | |
| 3,165,452 | 1/1965 | Williams | 203—11 |

FOREIGN PATENTS 1,092,441  11/1960  Germany.

NORMAN YUDKOFF, *Primary Examiner.*

F. E. DRUMMOND, *Assistant Examiner.*